United States Patent [19]
Doane, DeWitt H.

[11] 3,945,812
[45] Mar. 23, 1976

[54] METHOD OF FILTERING GREASE-LADEN AIR

[76] Inventor: Doane, DeWitt H., Rte. No. 2, Andover Road, Long Grove, Ill. 60047

[22] Filed: Nov. 25, 1974

[21] Appl. No.: 526,636

Related U.S. Application Data

[62] Division of Ser. No. 326,266, Jan. 24, 1973, Pat. No. 3,870,494.

[52] U.S. Cl. .................................................. 55/97
[51] Int. Cl.² .................... B01D 45/06; B01D 45/08
[58] Field of Search .......... 55/257, 1, 442, 97, 464, 55/443, 444, DIG. 10, DIG. 18, DIG. 36, DIG. 37; 98/115 K; 126/303

[56] References Cited
UNITED STATES PATENTS

| | | | |
|---|---|---|---|
| 2,831,550 | 4/1958 | Bub....................................... | 55/444 |
| 3,364,664 | 1/1968 | Doane............................... | 55/442 X |
| 3,376,804 | 4/1968 | Marks................................ | 55/442 X |
| 3,566,585 | 3/1971 | Voloshen et al.................. | 55/443 X |
| 3,813,856 | 6/1974 | Jensen ................................ | 55/444 |
| 3,870,494 | 3/1975 | Doane.................................. | 55/443 |

FOREIGN PATENTS OR APPLICATIONS

| | | | |
|---|---|---|---|
| 297,377 | 4/1917 | Germany ............................. | 55/443 |

OTHER PUBLICATIONS

"Grease filters RP" Research Products Corporation, Madison 1, Wisconsin, Form GF-1492, 10/08/1962.

*Primary Examiner*—Tim R. Miles
*Assistant Examiner*—N. Greenblum
*Attorney, Agent, or Firm*—Wolfe, Hubbard, Leydig, Voit & Osann, Ltd.

[57] ABSTRACT

A grease filtering method and apparatus for kitchen ventilating systems which is readily interchangeable with conventional mesh-type filters. The filter has substantially the same external dimensions as a mesh-type filter and produces substantially the same pressure drop as a mesh-type filter, so that it can be readily interchanged with the mesh-type filter without changing the requirements on the blower which draws the exhaust stream through the ventilating system. The filter uses a series of baffles to direct the exhaust stream in a tortuous path as it passes through the filter, thereby removing the condensable greases and oils by depositing them on the internal surfaces of the filter by centrifugal and ram action. The filter is completely self draining, since the extracted liquids continuously run down over the interior surfaces of the filter and then drain out of the filter through a plurality of drain holes provided along the front edge of the bottom wall. The specific baffle arrangement illustrated includes an entrance baffle extending rearwardly from one of the elongated edges of each of a plurality of entrance openings, an interior baffle disposed on the opposite side of the entrance opening from each entrance baffle, and an exit baffle extending forwardly from one of the elongated edges of each of a plurality of exit openings positioned between pairs of adjacent entrance openings.

8 Claims, 5 Drawing Figures

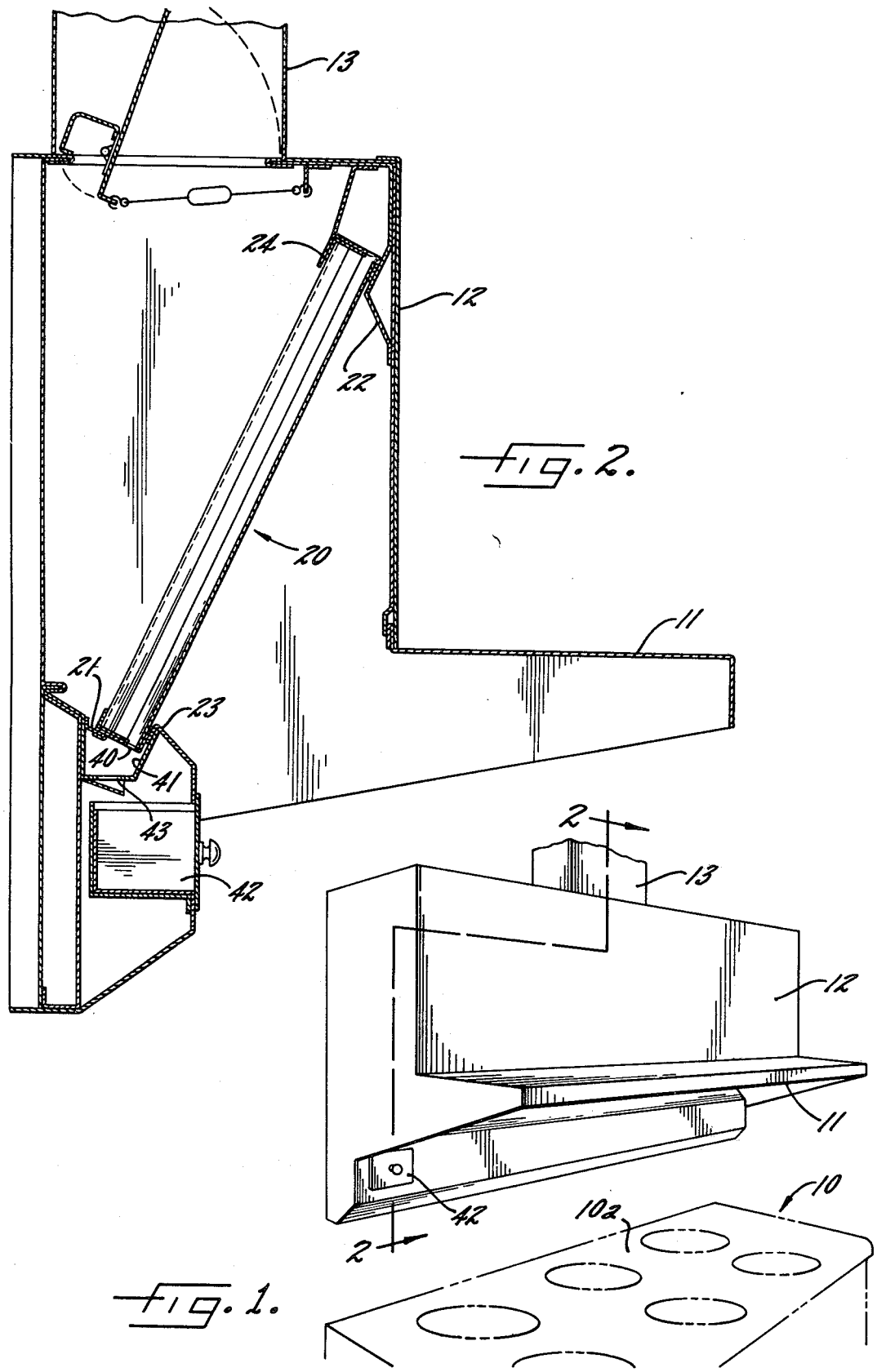

METHOD OF FILTERING GREASE-LADEN AIR

This is a division of application Ser. No. 326,266 filed Jan. 24, 1973, now U.S. Pat. No. 3,870,494.

The present invention relates generally to kitchen ventilating systems and, more particularly, to an improved grease filter for kitchen ventilating systems.

It is a primary object of the present invention to provide an improved grease filter which is suitable for use in ventilating systems in which mesh-type filters are normally used, but which does not utilize a mesh-type filtering medium.

A more specific object of the invention is to provide an improved grease filter which produces a relatively low pressure drop, of the same order to magnitude as the pressure drop produced by conventional mesh-type filters, and yet uses a baffle arrangement to filter the grease so that the filter is completely self-draining and does not retain the filtered grease in the exhaust stream as in mesh-type filters. In this connection, it is a related object of the invention to provide such a grease filter which is virtually self-cleaning and will never clog or drip.

Another specific object of the invention is to provide an improved grease filter of the foregoing type which is more effective than conventional mesh-type filters in removing grease from a kitchen exhaust stream, and which maintains substantially constant grease-extracting efficiency over its entire operating life.

A further object of the invention is to provide such an improved grease filter which can be efficiently manufactured at a low cost. In this connection, one particular object of the invention is to provide such a grease filter that can be made from only a few different parts.

Still another object of the invention is to provide such an improved grease filter which has a long operating life and requires only minimal maintenance. A related object is to provide such a grease filter which does not have any moving or easily damaged parts.

A still further object of the invention is to provide such an improved grease filter which is considerably safer than a mesh-type filter in the event of a fire at the cooking surface. Thus it is more specific object of the invention to provide such a grease filter which cannot burn out and confines accidental fires.

Other objects and advantages of the invention will be apparent from the following detailed description taken in connection with the accompanying drawings, in which:

FIG. 1 is a perspective view of a conventional cooking range and its associated ventilating system including a grease filter embodying the present invention;

FIG. 2 is an enlarged vertical section taken along line 2—2 in FIG. 1;

Figure 3:
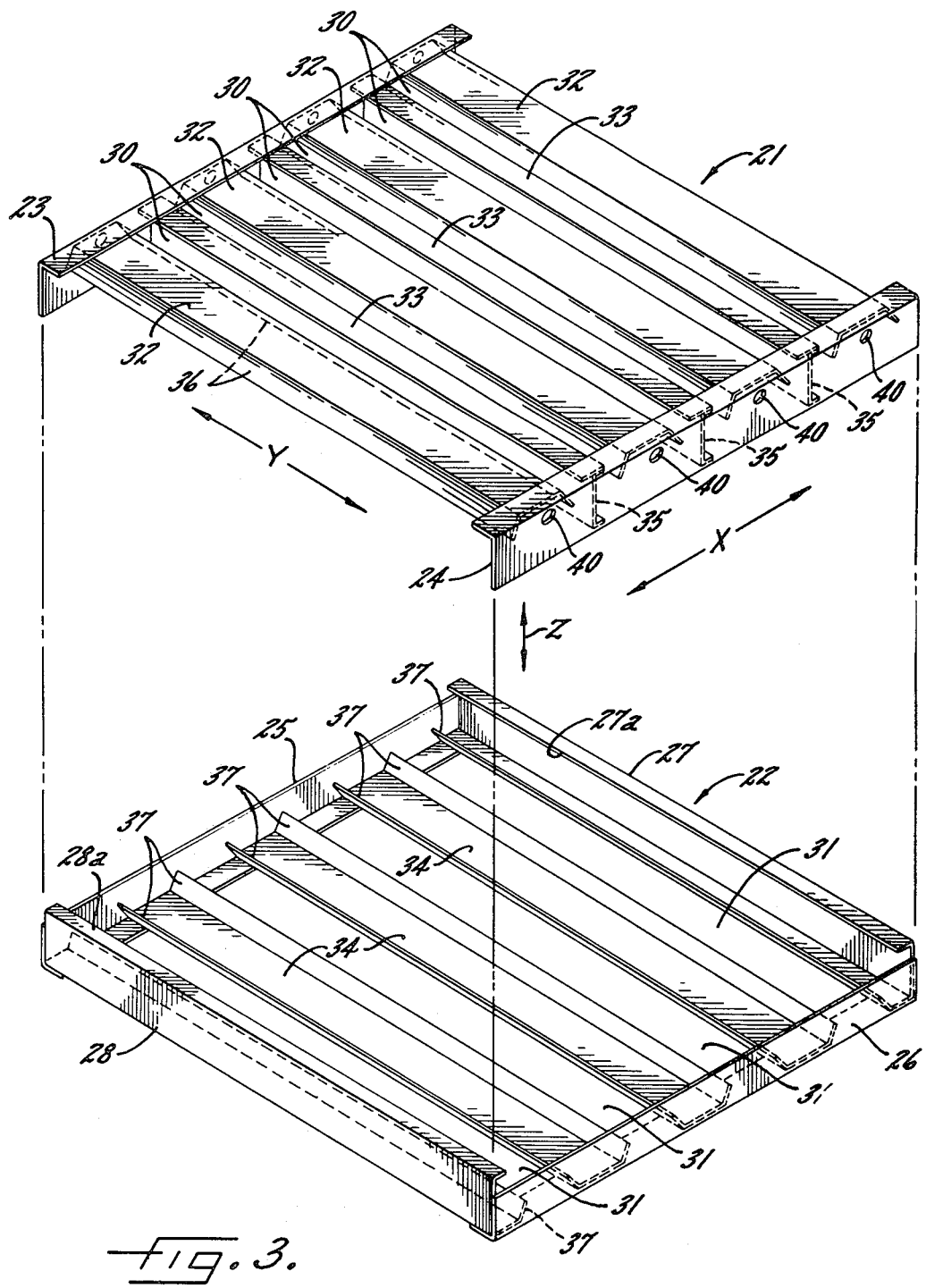
FIG. 3 is an exploded perspective view of the grease filter shown in the ventilating system in FIG. 2.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention.

Turning now to the drawings, in FIG. 1 there is shown a cooking range 10 having a cooking surface 10a from which hot fumes laden with grease and oil vapors and other condensable contaminants rise upwardly toward a canopy or hood 11 which projects out over at least a portion of the cooking surface 10a. The hood 11 is formed as an integral part of a housing 12 connected to an exhaust duct 13. Within the housing 12 one or more grease filters 20 are supported on a rear bracket 21 and a pair of front brackets 22 and 23. In addition, a spring plate 24 engages the rear side of the filter 20 along the top edge thereof to bias the filter against the front bracket 22, thereby preventing leakage of exhaust vapors along the top of the filter 20. To insert the filter 20 in the housing 12, the top of the filter is inserted between the bracket 22 and the spring plate 24 and pushed upwardly there between until the bottom of the filter clears the lower front bracket 23; the bottom of the filter is then moved rearwardly over the bracket 23 and allowed to drop onto the rear bracket 21.

As the hot grease-laden fumes rise upwardly beneath the hood 11, they are drawn into the housing 12 and upwardly through the grease filter 20 by means of a fan or blower (not shown) mounted within the duct 13 connected to the outlet of the housing 12. The rate at which the exhaust stream is drawn through the extraction system is determined by the blower, a typical flow rate being 300 cubic feet per minutes per lineal foot of ventilator (c.f.m.). As the exhaust stream leaves the housing 12, it is conducted via the duct 13 to an appropriate outlet for discharge to the atmosphere.

In accordance with the present invention, the filter 20 is dimensioned to fit in the space normally provided for mesh-type filters in a kitchen ventilating system, and is provided with a unique arrangement of interior baffles which can be economically manufactured and yet provide a relatively high grease extraction efficiency. Thus, as shown most clearly in FIGS. 3 – 5, the filter 20 comprises an external housing which is elongated in the X and Y directions (see FIG. 3) and relatively shallow in the Z direction so that the housing has substantially the same dimensions and proportions as those normally found in a mesh-type filter. For example, typical dimensions for the housing are from 15½ inches to 24½ inches in both the X and Y directions and less than 2 inches, preferably about 1¾ inches, in the Z direction. Thus, the grease filter provided by this invention is completely interchangeable with the conventional mesh-type filters.

In the particular embodiment illustrated, the external housing of the filter 20 is formed by a front section 21 telescoped over a rear section 22. The top and bottom walls of the filter are formed by a pair of L-shaped end plates 23 and 24 included in the front section 21 and overlapping a corresponding pair of L-shaped end plates 25 and 26 included in the rear section 22. After the two sections 21 and 22 are telescoped together, the two overlapping pairs of end plates 23, 25 and 24, 26 are welded together to form a rigid unitary construction.

To form the side walls of the housing, the rear section 22 includes a pair of side plates 27 and 28 which are welded at opposite ends to the two end plates 25 and 26. It can be seen that the short legs of the L-shaped end plates 23 – 26 are bent along the respective front and rear surfaces of the filter, and corresponding portions of the two side plates 27 and 28 are also bent inwardly along the respective front and rear surfaces of the filter so as to form what appears to be a frame around the entire periphery of the filter on both the front and rear sides thereof. In terms of the X, Y and Z axes referred to previously, the top and bottom walls of the filter housing lie in X-Z planes, the side walls lie in Y-Z planes, and the front and rear walls to be described below lie in X-Y planes.

To permit ingress and egress of the vaporous exhaust stream, the front wall of the filter housing forms a multiplicity of spaced entrance openings 30 which are uniformly elongated in the Y direction and relatively narrow in the X direction, and the rear wall forms an exit opening 31 midway between each pair of adjacent entrance openings 30, the exit openings 31 also being uniformly elongated in the Y direction and relatively narrow in the X direction. Thus, in the illustrative arrangement the front wall of the filter is formed by a series of alternating wide and narrow wall members 32 and 33, respectively, while the rear wall is formed by a pair of inturned flanges 27a and 28a on the respective side plates 27 and 28 and a series of rear wall members 34 regularly spaced between the two flanges 27a and 28a. The front wall members 32 and 33 are welded at opposite ends to the end plates 25 and 26. It can be seen that the spaces between the front wall members 32 and 33, and the spaces between the two end members 32 and the adjacent front flanges on the side plates 27 and 28, form a series of vertically elongated entrance openings 30 through which the vaporous exhaust stream enters the grease filter. Similarly, the space between the rear wall members 34, plus the spaces between the two end members 34 and the adjacent flanges 27a and 28a of the side plates, form a series of uniform vertically elongated exit openings 31 through which the vaporous exhaust stream exits from the grease filter. As shown most clearly in FIG. 5, the entrance openings 30 are more restricted than the exit openings 31 in the X direction, so as to increase the velocity of the exhaust stream as it enters the filter housing.

As the hot exhaust stream enters the grease filter through the entrance ways 30, it is deflected laterally toward a Y-Z baffle 35 by means of an entrance baffle 36. In the particular arrangement illustrated, each of the entrance baffles 36 is formed as an integral part of one of the front wall members 32, and is bent rearwardly within the filter housing at an angle of about 75° relative to the front face of the filter. Thus each entrance baffle 36 extends from one of the elongated edges of one of the entrance openings 30 toward the said plate 27 or 28 or the Y-Z baffle 35 closest to that entrance opening; each baffle 36 originates at the entrance opening edge that is farther away from the closest side wall or baffle 35 and extends rearwardly at an acute angle relative to the filter face so that the baffle 36 deflects an entering exhaust stream toward the closest side wall or baffle 35. If desired, the baffles 36 may be formed from a single sheet of metal forming the front walls 32 and 33 as well as the side plates 27 and 28, so that the width of each baffle 36 is equal to the width of the adjacent entrance opening 30. The Y-Z baffles 35 are similarly formed as integral parts of the front wall members 33, except for the two Y-Z baffles at the extreme sides of the filter which are formed by the side plates 27 and 28. Each of the baffles 35 extends from a line midway between an adjacent pair of exit openings 31 on a rear wall member 34 to a line midway between an adjacent pair of entrance openings 30 on a front wall member 33.

When the exhaust stream first enters the filter through the entrance openings 30, the gases expand, with an attendant velocity reduction, in the space between the entrance baffle 36 and the adjacent front wall member 33 or the front flange of the side plate 27 or 28. As the exhaust stream continues to move rearwardly through the filter, its velocity is increased again by the restricted area between the rear edge of the entrance baffle 36 and the adjacent Y-Z baffle 35. When the exhaust stream passes the rear edge of the entrance baffle 36, it again expands, with an attendant velocity reduction, in the space between the rear edge of the entrance baffle 36 and the rear wall of the filter housing.

When the exhaust stream reaches the rear of the filter housing, it is deflected forwardly by one of a pair of exit baffles 37 formed on the opposite vertical edges of each exit opening 31, preferably as integral parts of the rear walls. 34. Each of the baffles 37 extends from an elongated edge of one of the exit openings 31 toward the opposite elongated edge of the same opening at an acute angle relative to the rear wall of the housing and is dimensioned so that the front edge of the exit baffle 37 is spaced away from the rear edge of the entrance baffle 36 in both the X and Z directions. The exhaust stream flows forwardly between the entrance and exit baffles 36 and 37, and then rearwardly agains as it is drawn out of the filter through the exit opening 31 between the two exit baffles 37. To ensure a low pressure drop across the filter, the distance between the front edges of the two exit baffles 37 associated with each exit opening 31 is preferably at least twice the width of each exit opening 30 in the X direction. The continuous swirling of the exhaust stream as it passes through the grease filter subjects the condensable grease and oil in the exhaust stream to centrifugal action which causes the grease and oil to be deposited or "plated out" on the interior surfaces of the housing walls and the baffles. In addition, there is a ram action as the exhaust stream is directed against the Y-Z baffles 35 and then against the rear walls and the exit baffles 37, producing further deposition of the condensable grease and oil on the interior surfaces of the filter. Moreover, the velocity changes effected by the varying cross sectional area of the tortuous path followed by the exhaust stream enhances condensation of the entrained grease and oil to further improve the extraction efficiency.

Figure 5:
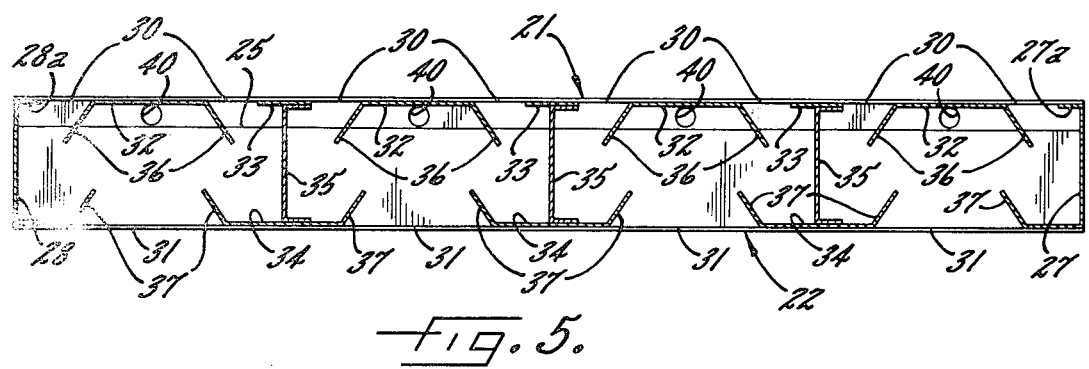
FIG. 5 is a section taken along line 5—5 in FIG. 4.

As can be seen most clearly in FIG. 5, the distance between any point on any of the baffles 35, 36 or 37 and any other interior surface of the filter other than the surface to which each respective baffle is connected, is at least as great in the X-Y plane as the width of one of the entrance openings 30 in the X direction. Thus, the cross-sectional area of the fluid flow path within the filter gradually increases between the entrance openings 30 and the exit openings 31, thereby reducing the static pressure inside the filter.

Figure 4:
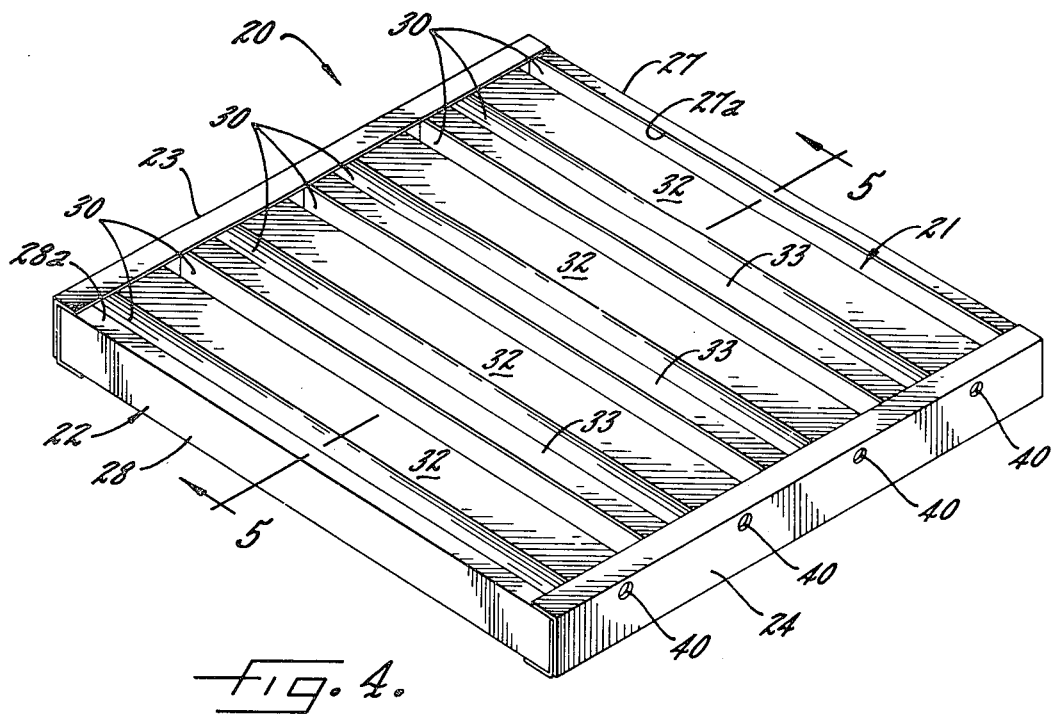
FIG. 4 is a front perspective view of the grease filter shown in the ventilating system in FIG. 2.

Since the grease filter is located directly over or adjacent to the cooking surface 10a, the surfaces of the housing walls and the internal baffles on which the extracted grease and oil is deposited are at a sufficiently high temperature to cause the deposited material to remain in a fluid condition and run down to the bottom of the housing. In this connection, it should be noted that all of the internal baffles run parallel to the Y axis, so that the materials deposited thereon can flow continuously to the bottom of the filter without passing through the exhaust stream and becoming re-entrained therein. When the extracted liquids reach the bottom of the filter, they flow toward the front corner thereof since the filter is normally mounted in an inclined position as shown in FIG. 2. At the front edge of the bottom wall of the filter housing, the extracted liquids are drained out of the filter through a multiplicity of drain openings 40 formed in the end plate 24 directly adjacent the front wall of the housing. As can be seen in FIGS. 3 and 5, the end plates 25 and 26 do not overlap the entire width of the corresponding end plates 23 and 24 when the two filter sections 21 and 22 are telescoped together, so that the drain openings 40 remain uncovered in the final assembly. To minimize leakage of the exhaust stream through the drain openings 40, they are perferably located midway between the rear surfaces of each pair of adjacent entrance baffles 36. And to facilitate installation of the filter, the drain openings 40 are preferably provided in both ends of the filter so that it can be inserted in the housing 12 with either end at the bottom, as long as the entrance openings 30 are oriented in the vertical direction.

Referring to FIG. 2, as the extracted liquids are drained out of the filter 20 through the drain openings 40, the liquids are collected in a trough 41 which runs continuously along the entire length of the brackets which support the filters 20. The trough 41 is inclined toward a grease drawer 42 at one end of the housing 12, and a drain hole 43 is formed in a trough 41 directly above the drawer 42 so that the extracted liquids continuously flow to the lower end of the trough 41 and then run down through the drain hole 43 into the drawer 42. As the drawer 42 becomes filled with accumulated grease and oil, it is periodically removed and cleaned.

It can be seen that the illustrative grease filter is continuously self-draining, so that the extracted liquids are quickly removed from the interior of the filter. Consequently, in the event of a fire there is very little grease or oil inside the filter 20 to fuel the fire at any given time. This is in contrast to mesh-type filters which normally retain all the extracted grease and oil within the filter housing. Furthermore, the continuous removal of the extracted grease and oil provides the illustrative grease filter with a substantially constant extraction efficiency, which is again in contrast to mesh-type filters which have a decreasing extraction efficiency due to the accumulation of extracted materials within the filtering medium. Moreover, the continuous self-draining construction also facilitates cleaning of the filter, since cleaning solutions can run freely through the interior of the extractor in the same manner as the extracted liquids, and over the same surfaces.

Another significant advantage of the grease filter provided by this invention is that it can be efficiently manufactured. Thus, the illustrative filter requires only a small number of different parts, and the parts can be assembled by relatively few simple welding operations. Moreover, many of the parts are interchangeable with each other; for example, the two end plates 23 and 24 are interchangeable with each other, as arc the end plates 25 and 26, the side plates 27 and 28, and each of the front and rear wall members 32, 33 and 34. Furthermore, each of these parts can be preformed by simple stamping operations so that the entire manufacturing process can be carried out rapidly and at a low cost, using a minumum amount of manual labor.

Finally, the improved filter of the invention produces only a relatively low pressure drop in the ventilating system, of the same order of magnitude as the pressure drop produced by conventional mesh-type filters. Consequently, this filter can be readily interchanged with the mesh-type filters without changing the requirements for the blower which draws the exhaust stream through the system.

I claim:

1. A grease filtering method for kitchen ventilating systems and the like, said method comprising the steps of providing a housing that is elongated in the X and Y directions and less than 2 inches in the Z direction so that the housing will fit in the space normally provided for mesh-type filters in a kitchen ventilating system, said housing forming closed top and bottom walls lying substantially in X-Z planes, closed side walls lying substantially in Y-Z planes, and front and rear walls lying substantial in X-Y planes, said front wall forming a multiplicity of spaced entrance openings which are uniformly elongated in the Y direction and relatively narrow in the X direction, each of said entrance openings formed by a pair of edges of said front wall elongated in the Y direction on opposite sides of the opening, said rear wall froming a multiplicity of exit openings each of which is midway between a pair of adjacent entrance openings, said exit openings also being uniformly elongated in the Y direction and relatively narrow in the X direction, a multiplicity of interior baffles lying substantially in Y-Z planes within said housing, each of said interior baffles comprising a single sheet of metal extending from a line midway between an adjacent pair of said exit openings on said rear wall to a line midway between an adjacent pair of said entrance openings on said front wall so that opposite sides of each of said interior baffles are exposed to said ajdacent pair of entrance openings, a multiplicity of entrance baffles equal to the number of entrance openings extending into said housing from the elongated edges of said entrance openings, each of said entrance baffles extending from one of the elongated edges of one of said entrance openings toward the side wall or the interior baffle that is closest to said entrance opening with the rear edge of each entrance being spaced farther away from said closest sidewall or interior baffle than the other elongated edge of its entrance opening, the entrance baffle originating at the entrance opening edge in said front wall that is farther away from said closest side wall or interior baffle and extending toward said closest side wall or interior baffle and extending toward said closest side wall or interior baffle at an acute angle relative to said front wall so as to deflect an entering exhaust stream toward said closest side wall or interior baffle as the exhaust stream passes rearwardly through said housing, and a multiplicity of exit baffles equal to the number of entrance baffles extending into said housing front the elongated edges of said exit openings, each of said exit baffles extending from an elongated edge of one of said exit openings toward the opposite elongated edge of the same exit opening at an acute angle relative to said rear wall so as to deflect the exhaust stream moving rearwardly from each entrance opening in the forward direction away from said rear wall before the exhaust stream is discharged through said exit opening, said bottom wall forming a multiplicity of drain openings adjacent said front wall and spaced away from said entrance openings in the X direction; passing an exhaust stream containing condensable grease and oil through said entrance openings and rearwardly between each of said entrance baffles and the adjacent Y-Z side wall or interior Y-Z baffle, then forwardly between each of said entrance baffles and the adjacent exit baffle, and finally rearwardly between each pair of exit baffles on opposite edges of each exit opening and out through the exit opening; and collecting extracted liquids drained through said drain openings below the bottom wall of said housing.

2. A grease filtering method as set forth in claim 1 wherein said exhaust stream is passed through all of said entrance openings at the same time.

3. A grease filtering method as set forth in claim 1 wherein the rear edges of said entrance baffles and the front edges of said exit baffles are spaced away from each other in both the X and Z directions.

4. A grease filtering method as set forth in claim 1 wherein the distance between the front edges of the two exit baffles for each exit opening in the X direction is substantially twice the width of each entrance opening in the X direction.

5. A grease filtering method as set forth in claim 1 wherein the width of each entrance baffle, between its front and rear edges, is substantially the same as the width of each entrance opening in the X direction.

6. A grease filtering method as set forth in claim 1 wherein the distance between any of said baffles and any other surface inside said housing, other than the surfaces to which each respective baffle is connected, is at least as great in the X-Y plane as the width of said entrance openings in the X directions.

7. A grease filtering method as set forth in claim 1 wherein said entrance baffles are formed as integral parts of said front wall.

8. A grease filtering method as set forth in claim 1 wherein said exit baffles are formed as integral parts of said rear wall.

* * * * *